United States Patent [19]

Holley et al.

[11] 4,287,878
[45] Sep. 8, 1981

[54] PORTABLE SOLAR HEATER STRUCTURE

[75] Inventors: Danforth Holley; Danforth E. Holley, both of Grosse Pointe Shores, Mich.

[73] Assignee: Holly International Company, Grosse Pointe Farms, Mich.

[21] Appl. No.: 39,684

[22] Filed: May 16, 1979

[51] Int. Cl.³ .............................................. F24J 3/02
[52] U.S. Cl. .................................... 126/429; 126/449
[58] Field of Search ............... 126/428, 429, 432, 449, 126/450, 438, 440

[56] References Cited

U.S. PATENT DOCUMENTS

| 2,907,318 | 10/1959 | Awot | 126/438 |
|---|---|---|---|
| 3,832,992 | 9/1974 | Trombe et al. | 126/429 |
| 3,863,621 | 2/1975 | Schoenfelder | 126/429 |
| 3,875,925 | 1/1974 | Johnston | 126/429 |
| 3,946,720 | 3/1976 | Keyes et al. | 126/429 |
| 4,030,477 | 6/1977 | Smith | 126/438 |
| 4,068,652 | 1/1978 | Worthington | 126/430 |
| 4,121,565 | 10/1978 | Grisbrook | 126/429 |
| 4,169,459 | 10/1979 | Ehrlich | 126/432 |

FOREIGN PATENT DOCUMENTS

| 2306410 | 10/1976 | France | 126/429 |
|---|---|---|---|
| 2351364 | 12/1977 | France | 126/429 |

OTHER PUBLICATIONS

"Alternative Sources of Energy", Feb. 1974, No. 13, p. 51.

Primary Examiner—James C. Yeung
Attorney, Agent, or Firm—Whittemore, Hulbert & Belknap

[57] ABSTRACT

Portable solar heater structure comprising a substantially rectangular frame having a back with openings therethrough for permitting air to be drawn into the solar heater, a layer of insulating material in contact with the back, a plurality of cup-shaped solar collectors open toward the front of the solar heater structure positioned adjacent the insulating material, a cover over the front of the solar heater having openings therein adjacent the top thereof through which air heated by the solar heater is passed and a passage between the openings in the back and cover of the solar heater through which relatively cool air is drawn through the openings in the back over the collectors to be heated for subsequent withdrawal through the openings in the cover.

5 Claims, 6 Drawing Figures

4,287,878

PORTABLE SOLAR HEATER STRUCTURE

BACKGROUND OF THE INVENTION

1. Field of the Invention

The invention relates to heater structures and refers more specifically to an easily portable solar heater unit simple in construction, economical to manufacture, and efficient in use.

2. Description of the Prior Art

In the past, portable heaters have usually taken the form of electric or gas operated heating devices. Such devices have included deflectors and/or blowers in conjunction therewith for radiating heat therefrom. Such prior units have thus required fuel supplies or access to electrical energy at the location of use. Fuel supplies and electrical energy for use in operating known portable heating units are in limited supply and are further limited or non-existent in particular areas.

SUMMARY OF THE INVENTION

In accordance with the invention, portable solar heater structure is provided including a rectangular frame, a back having an opening therein to permit cool air to be drawn into the solar heater structure, a layer of insulating material within the solar heater structure in engagement with the back thereof, a plurality of solar collectors positioned within the frame adjacent the front of the solar heater structure, a cover over the front of the solar heater structure in spaced relation to the solar collectors, substantially transparent to the sun rays, and having an opening adjacent the top thereof for withdrawal of heated air from the solar heater structure, and a passage for air between the opening in the back and cover through which air is drawn past the collectors.

In one modification of the invention, the solar collectors are cup-shaped and one or more of them may have Christmas tree shaped solar diffusers therein.

The solar heater structure may be free standing room units or may be indow units.

DESCRIPTION OF THE PREFERRED EMBODIMENT

Figure 2:
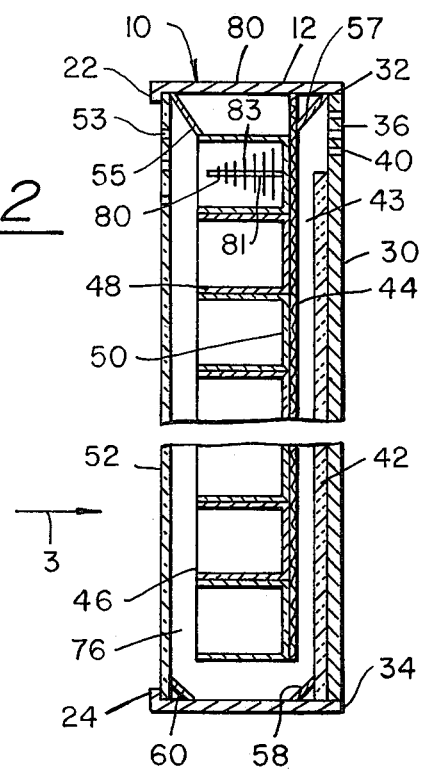
FIG. 2 is an enlarged longitudinal section view of the solar heater structure illustrated in FIG. 1, partly broken away, taken substantially on the line 2—2 in FIG. 3.
Figure 3:
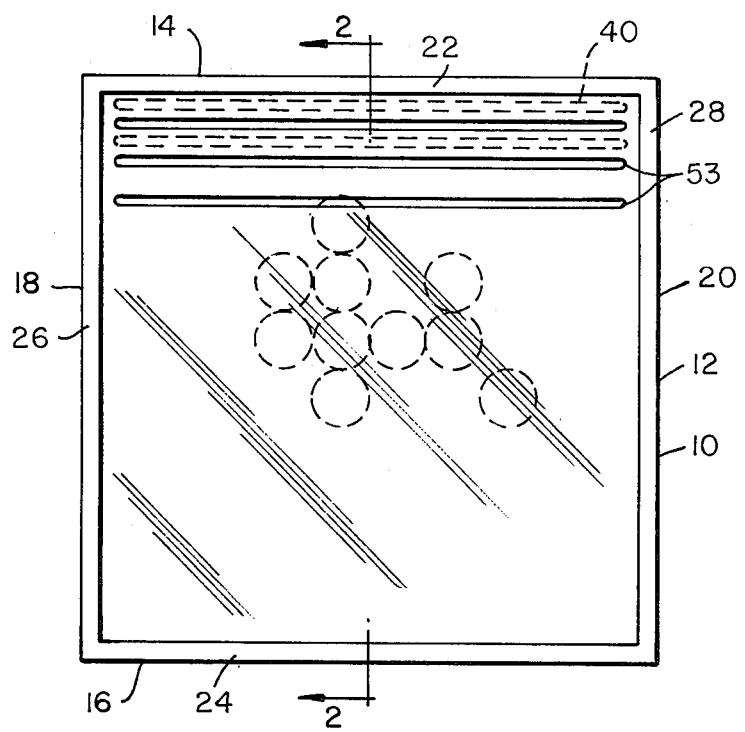
FIG. 3 is an enlarged front elevation view of the solar heater structure illustrated in FIG. 1, taken substantially in the direction of arrow 3 in FIG. 2.

The solar heater structure 10 of the invention, as shown best in FIGS. 2 and 3, includes an outer rectangular frame 12 having a top 14, bottom 16 and sides 18 and 20. The members 14, 16, 18 and 20 are terminated in flanges 22, 24, 26 and 28.

A back 30 is secured to the back edges 32, 34, 36 and 38 of the top 14, bottom 16 and sides 18 and 20 of the frame 12 by convenient means, not shown. The back 30 which forms the shade elevation of the solar heater structure 10 includes a plurality of solts 40 therein in spaced relation to each other at the top thereof extending between the sides 18 and 20. Cool air is drawn into the solar heater structure 10 through the slots 40 with the solar heater structure 10 in operation.

A layer 42 of insulating material is positioned within the frame 12 in engagement with the back 30. In one modification of the solar heater structure 10 wherein the frame 12 was approximately two feet square, the layer of insulating material 42 was approximately two inches thick. The layer 42 may be, for example, a fiber glass batt or a styrofoam sheet.

Spacing member 44 is provided in spaced relation with the insulating material 42 and spaces insulating material 42 from the solar collectors 46. The spacing member 44 may be corrugated metal and in conjunction with the insulating material 42 provides a passage 43 through which air is drawn through slots 40.

Solar collectors 46, as shown, are positioned in rows and columns within the solar heater structure 12 on the spacing member 44. The solar collectors 46 may be cylindrical aluminum cans open at the end 48 and having a black heat absorbing inner surface which may be painted thereon. As shown, the bottoms 50 of the solar collectors 46 are in engagement with the spacing member 44.

A cover 52 is positioned over the exposed elevation of the solar heater structure 10. The cover 52 may be translucent fiber glass sheet and, as shown, is secured against the flanges 22, 24, 26 and 28 by convenient means, not shown, in spaced relation to the solar collectors 46. In one embodiment, the spacing between the open ends 48 of the solar collectors 46 and the cover 52 was approximately two inches. The cover 52 includes slots 53 therein at the top thereof extending between the sides 18 and 20 through which heated air passes out of the solar heater structure 10.

Figure 1:
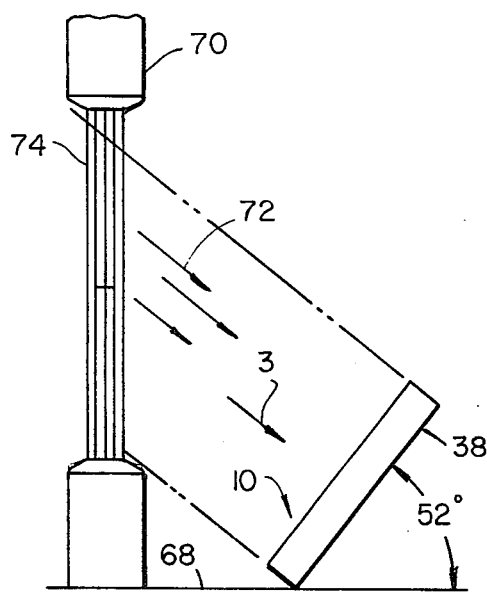
FIG. 1 is a diagrammatic representation of solar heater structure constructed in accordance with the invention in installation on the inside of a building.

In use, the solar heater structure 10 is positioned to make an angle of substantially 52° with respect to a horizontal floor, as shown best in FIG. 1. In such position, the solar heater structure 10 makes best use of the sun's rays most of the time.

In operation, with the portable heater structure 10 positioned as shown in FIG. 1 on the floor 68 of building structure 70, receiving the sun's rays 72 through window structure 74, the solar collectors 46 will collect heat from the sun's rays to heat the air within the solar heating structure 10 and particularly that in the solar collectors 46 and the air space 76 adjacent the open ends thereof.

The heated air will rise in the air space 76 and pass out of the openings 53 at the top of the cover 52 past baffle 55. Cool air will be drawn into the solar heater structure 10 through the openings 40 in the bottom of the back of the solar heater structure 10 and through passage 43 guided by baffles 57, 58 and 60. The warm air coming from the solar heater structure 10 may be used as a heat screen in front of the window structure 74 with the portable solar heating structure 10 utilized in the building 70.

In a particular installation such as the installation shown in FIG. 1, the gain in temperature of the air in the solar heater structure 10 over that of room temperature in the time shown on the date shown was in accordance with the following chart:

| Date | Room Temp. | Temperature | Temp. Gain | Time |
|---|---|---|---|---|
| 3-28-78 | 68° | 78° C. | 2° | 5 hrs. |
| 3-29-78 | 68° | 80° C. | 12° | 5 hrs. |
| 3-30-78 | 66° | 114° C. | 48° | 4 hrs. |
| 4-02-78 | 70° | 114° C. | 44° | 4 hrs. |
| 4-05-78 | 74° | 108° C. | 34° | 2 hrs. |
| 4-06-78 | 74° | 76° C. | 1° | 4 hrs. |
| 4-07-78 | 72° | 120° C. | 48° | 6 hrs. |
| 4-10-78 | 72° | 108° C. | 36° | 3 hrs. |
| 4-11-78 | 68° | 90° C. | 22° | 6 hrs. |
| 4-12-78 | 70° | 116° C. | 46° | 4 hrs. |
| 4-13-78 | 70° | 120° C. | 50° | 4 hrs. |

The difference in the heat gain is due to the climactic conditions on the days shown.

With a Christmas tree type diffuser 80, as shown in copending patent application, Ser. No. 039,682, filed May 16, 1979, and in FIG. 2 herein, placed in the solar collector 46 in the upper right hand corner of the solar heater 10, the temperature gain at the solar collector in the upper right hand corner was 58° in approximately forty minutes on a particular day with no appreciable temperature rise in the upper left hand corner of the solar heating unit 10 wherein no diffuser was utilized.

Accordingly, the Christmas tree diffuser 80 constructed of a tube 81 for a trunk and having transverse slots therethrough with thin metal foil limbs 83 randomly placed thereon in the shape of a Christmas tree extending through the transverse slots in the tube, the solar heat collected by a collector 46 is greatly increased over the heat collected in a similarly positioned collector without a diffuser therein.

Similarly, the temperature rise at a solar collector 46 in the third row from the top in the center of the solar heating unit 10 was 70° in fifty minutes with a solar diffuser in the collector 46.

It is hypothesized that the metal Christmas tree diffuser deflects and diffuses the sun's rays as they enter the collector 46 in the solar heating unit 10 so that they remain longer in the collector to thereby increase the heat absorbed therefrom.

Figure 4:
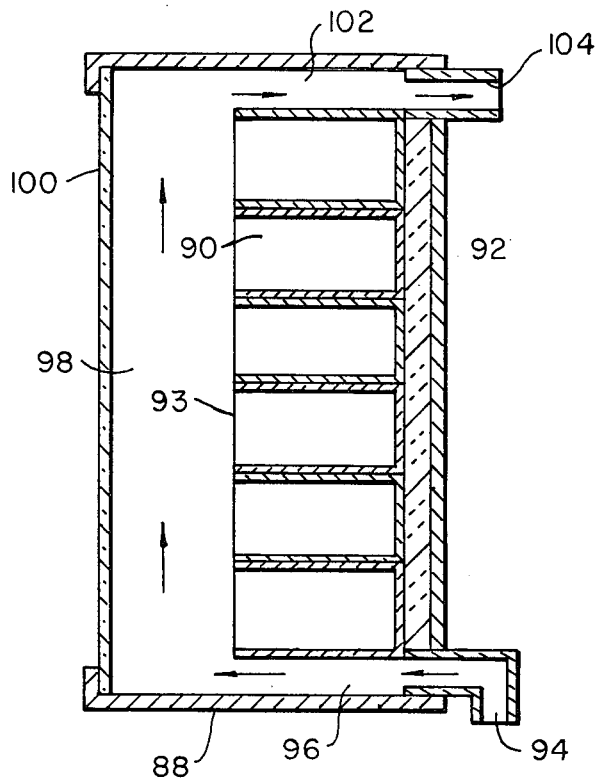
FIG. 4 is an enlarged longitudinal section view similar to FIG. 2 of a modification of the solar heater structure.

In the modified solar heater structure 88 illustrated in FIG. 4, the collectors 90 are engaged with the insulating material 92. In such structure, the air is drawn through the opening 94, through the passage 96, through the air space 98 between the cover 100 and the open ends 93 of the collectors 90, through the passage 102 and out through the opening 104. Openings 94 and 104 and passages 96 and 102 may extend for the complete width of the modified solar heater structure 88. In all other respects the solar heater structure 88 is similar to the solar heater structure 10.

Figure 5:
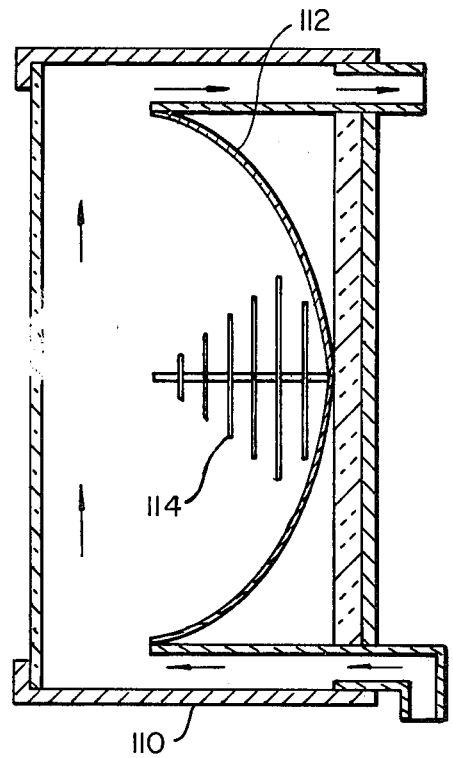
FIG. 5 is an enlarged longitudinal section view similar to FIG. 2 of another modification of the solar heater structure.

In the further modified solar heater structure 110 of FIG. 5, a single large, parabolic solar collector 112 replaces the solar collectors 90 of the modified solar heater structure 88 illustrated in FIG. 4. As shown, a Christmas tree type solar diffuser 114 may be used in conjunction with the solar collector 110. In all other respects the solar structure 110 is similar to the solar heater structure 88.

Figure 6:
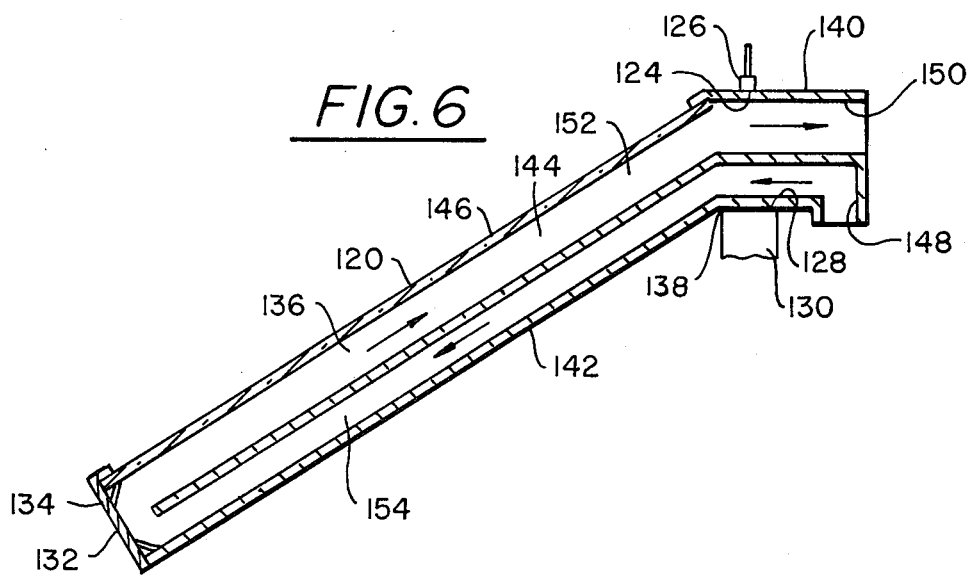
FIG. 6 is an enlarged longitudinal section view of still another modification of the solar heater structure suitable for use as a window unit.

The modified solar heater structure 120 illustrated in FIG. 6 is a window unit. As such, the solar heater structure 120 is shown positioned in a window opening 124 between window 126 and window sill 128 of building structure 130.

The solar heater structure 120 includes a generally rectangular frame 132 closed at the lower end 134 and both sides 136. The solar heater structure 120 is offset at an angle of approximately 45° at point 138 so that the upper end 140 extends horizontally between the window sill 128 and window 126, while the rest of the solar heater structure 120 makes an angle of approximately 45° with the wall 130. The solar heater structure 120 further includes the bottom 142 which may be insulated as required, a central heat absorbing panel 144 and a cover 146, which again may be of translucent fiber glass sheet. The heat absorbing panel 144 may again have a dark painted surface to absorb heat from the sun's rays passing through the cover 146. The end 140 is open to provide passages 148 and 150 through which air may be drawn into and discharged from the solar heater structure 120, respectively. The solar heater structure 120 may be substantially as wide as the window opening 124 and of the same cross section throughout.

In operation, with the solar heater structure 120 positioned in the window opening 124, as shown best in FIG. 6, the sun's rays passing through the cover 146 and striking the panel 144 will heat the panel 144 and the air in the passage 152 above the panel 144. The air in the passage 152 will, due to its being heated, pass upwardly in the passage 152 and out of the opening 150 into the building 130. The air passing from the passage 152 will cause cool air to be drawn into the opening 148 and through the passage 154 and subsequently around the end 134 of the solar heater structure 120 into the passage 152. Consequently, a continuous convective loop heating the inside of the building 130 will be generated when the sun shines.

Should the sun cease to shine, the air in the passage 152 would cool and tend to sink to the end 134 of the solar heater structure 120 to shut off the convective loop. Thus, no warm air would be drawn from the building, for example, at night when the sun is not shining to heat the panel 144.

While one embodiment and modifications of the present invention have been considered in detail, it will be understood that other embodiments and modifications thereof are contemplated by the inventor. For example, the collector means could be vacuum tube, solar cell or other type. Likewise, any type of solar diffuser may be substituted for the Christmas tree diffuser disclosed. Also, by adding appropriate structure such as a condenser, the solar heater structures disclosed could be used in an air conditioning system or refrigeration cycle. It is the intention to include all embodiments and modifications as are defined by the appended claims within the scope of the invention.

I claim:

1. Solar heater structure comprising an outer frame having a top, a bottom and two sides defining an exposed elevation and a shade elevation, a back covering the shade elevation of the frame having opening means therein adjacent said top permitting cool air to pass therethrough into the solar heater structure, insulating material within the frame positioned adjacent the back, solar collector means opening toward the exposed elevation of the frame positioned within the frame in spaced relation to said back, said solar collector means being secured to the top of the frame so as to prevent flow of heated air passing over the collector across the top of the collector and out of the back of the frame, being in spaced relation to the bottom of the frame to permit flow of air entering through the back of the frame across the bottom of the collector and upward across the front of the collector, and extending entirely between the sides of the frame, a cover over the exposed side of the frame which is transparent to sun rays in spaced relation to the solar collector means said cover having opening means therein adjacent the top thereof permitting heated air to pass out of the solar heater structure adjacent the top thereof, and a passage in the solar heater structure including the space between the insulating material and the back of the collector, the space between the bottom of the collector and the bottom of the frame and the space between the front of the collector and the cover through which air is drawn from the opening means in the back over the insulating material and past the solar collector means to the opening means in the cover.

2. Structure as set forth in claim 1, wherein the opening means for passing cool air into the solar heater structure and permitting heated air to pass out of the solar heater structure comprises slots in the back adjacent the top thereof extending transversely of the solar heater structure and slots in the cover adjacent the top thereof also extending transversely of the solar heater structure, respectively.

3. Structure as set forth in claim 1, and further including a solar diffuser in at least some of the solar collector means.

4. Structure as set forth in claim 3 wherein the solar diffuser is a metal Christmas tree shaped device operable to deflect and diffuse the suns rays in the collector.

5. Structure as set forth in claim 1, wherein the solar collector means is a plurality of cylindrical aluminum cans having a black interior.

* * * * *